United States Patent
Qian et al.

(10) Patent No.: US 12,207,214 B1
(45) Date of Patent: Jan. 21, 2025

(54) CLOCK SYNCHRONIZATION IN A TOUCH SENSING SYSTEM

(71) Applicant: GOOGLE LLC, Mountain View, CA (US)

(72) Inventors: Chengliang Qian, Mountain View, CA (US); Premal Parekh, Mountain View, CA (US); Hu-Chi Chang, Taipei (TW); Yung-Tsung Chen, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/400,621

(22) Filed: Dec. 29, 2023

(51) Int. Cl.
- *H04W 56/00* (2009.01)
- *G06F 3/0354* (2013.01)
- *G06F 3/038* (2013.01)
- *G06F 3/041* (2006.01)
- *G06F 3/044* (2006.01)

(52) U.S. Cl.
CPC .... *H04W 56/0035* (2013.01); *G06F 3/03545* (2013.01); *G06F 3/0383* (2013.01); *G06F 3/04162* (2019.05); *H04W 56/003* (2013.01); *G06F 3/04182* (2019.05); *G06F 3/04184* (2019.05); *G06F 3/0442* (2019.05); *G06F 2203/0384* (2013.01)

(58) Field of Classification Search
CPC ............ H04W 56/0035; H04W 56/003; G06F 3/03545; G06F 3/0383; G06F 3/04162; G06F 3/04182; G06F 3/04184; G06F 3/0442; G06F 2203/0384
See application file for complete search history.

(56) References Cited

U.S. PATENT DOCUMENTS

| | | | |
|---|---|---|---|
| 2014/0168142 A1* | 6/2014 | Sasselli | G06F 3/044 345/174 |
| 2014/0267078 A1* | 9/2014 | Kukulski | G06F 3/04162 345/173 |
| 2022/0011916 A1* | 1/2022 | Chen | G06F 3/04162 |
| 2023/0161425 A1* | 5/2023 | Chen | H04W 56/001 345/179 |
| 2024/0077971 A1* | 3/2024 | Kim | G06F 3/0441 |

* cited by examiner

*Primary Examiner* — Amit Chatly
(74) *Attorney, Agent, or Firm* — Oblon, McClelland, Maier & Neustadt, L.L.P.

(57) ABSTRACT

A method, apparatus, and computer-readable medium for determining a tolerance specification of a clock synchronization between a touch display device (TDD) and a stylus. In the method, an accumulated timing error between the TDD and the stylus is determined based on crystal inaccuracies of the TDD and the stylus, connection interval of Bluetooth communication between the TDD and the stylus, and a number of consecutive failed transmissions of the Bluetooth communication. A total processing delay is determined based on a first processing delay and a second processing delay. The first processing delay is a time delay of sending a synchronization signal from touch driving circuitry of the TDD to Bluetooth circuitry of the TDD. The second processing delay is a time delay of sending a Bluetooth packet from the TDD to the stylus. The tolerance specification is determined based on the accumulated timing error and the total processing delay.

20 Claims, 8 Drawing Sheets

CLOCK SYNCHRONIZATION IN A TOUCH SENSING SYSTEM

TECHNICAL FIELD

The present disclosure relates to a touch sensing system, and more specifically, to clock synchronization between a stylus and a touch display device in the touch sensing system.

BACKGROUND

A touch display device can allow a user to input information or commands by using a finger, a stylus (or a pen), and the like. When the stylus is close to a display panel (or a touchscreen) of the touch display device, the touch display device can detect the stylus and setup a communication (e.g., a bidirectional communication) with the stylus.

SUMMARY

Aspects of the disclosure provide a method for determining a clock synchronization between a touch display device and a stylus. The method includes determining an accumulated timing error between the touch display device and the stylus based on crystal inaccuracies of the touch display device and the stylus, connection interval of Bluetooth communication between the touch display device and the stylus, a number of consecutive failed transmissions of the Bluetooth communication. The method includes determining a total processing delay based on a first processing delay and a second processing delay. The first processing delay is a time difference between a sending time of sending a synchronization signal from touch driving circuitry of the touch display device and a receiving time of receiving the synchronization signal by Bluetooth circuitry of the touch display device. The second processing delay is a time difference between a sending time of sending a Bluetooth packet from the touch display device and a receiving time of receiving the Bluetooth packet by the stylus. The method includes determining the tolerance specification of the clock synchronization based on the accumulated timing error and the total processing delay, wherein the clock synchronization is performed based on the tolerance specification.

In an embodiment, the determining the accumulated timing error includes determining the accumulated timing error based on a third processing delay between a first successful Bluetooth transmission from another device to the stylus and a second successful Bluetooth transmission from the touch display device to the stylus. The first successful Bluetooth transmission is received by the stylus after the consecutive failed transmissions and before the second successful Bluetooth transmission.

In an embodiment, the determining the accumulated timing error includes calculating a first product of the connection interval and the number of consecutive failed transmissions of the Bluetooth communication, calculating a first sum of the first product and the third processing delay, calculating a second sum of the crystal inaccuracies of the touch display device and the stylus, and determining the accumulated timing error as a second product of the first sum and the second sum.

In an embodiment, the determining the total processing delay includes determining the total processing delay as a sum of the first processing delay and the second processing delay.

In an embodiment, the tolerance specification is determined to be greater than both of the accumulated error and the total processing delay.

In an embodiment, the method includes instructing the stylus to perform the clock synchronization under the tolerance specification.

In an embodiment, the method includes informing at least one of the stylus or the touch display device of the tolerance specification.

In an embodiment, the clock synchronization is performed by determining a time period based on a starting time of a last connection event of the Bluetooth communication and the receiving time of receiving the synchronization signal by the Bluetooth circuitry of the touch display device, determining a number of connection events of the Bluetooth communication that have been transmitted from the Bluetooth circuitry of the touch display device to the Bluetooth circuitry of the stylus until the Bluetooth circuitry of the touch display device receives the synchronization signal, and sending the time period and the number of connection events of the Bluetooth communication from the Bluetooth circuitry of the touch display device to the Bluetooth circuitry of the stylus within a next connection event of the Bluetooth communication.

In an embodiment, in response to the time period being successfully received by the Bluetooth circuitry of the stylus, the clock synchronization is performed by determining a timestamp based on the time period and the receiving time of receiving the Bluetooth packet by the Bluetooth circuitry of the stylus, sending the timestamp from the Bluetooth circuitry of the stylus to the processing circuitry of the stylus, determining an adjusted starting time of a downlink signal based on the timestamp and a predefined time period, and transmitting the downlink signal from the processing circuitry of the stylus to the touch driving circuitry of the touch display device based on the adjusted starting time.

In an embodiment, the predefined time period is determined based on the connection interval of the Bluetooth communication and a frequency of the synchronization signal.

In an embodiment, a frequency of the downlink signal is the same with a frequency of the synchronization signal.

In an embodiment, in response to the time period not being successfully received by the Bluetooth circuitry of the stylus, the clock synchronization is performed by transmitting a downlink signal from the processing circuitry of the stylus to the touch driving circuitry of the touch display device based on a last synchronization.

In an embodiment, the clock synchronization is performed by receiving one or more event counts at the Bluetooth circuitry of the stylus, each connection event count being associated with a respective time period, determining a maximum count of the one or more connection event counts, determining the time period associated with the maximum count, determining a timestamp based on the time period, determining an adjusted starting time of a downlink signal based on the timestamp and a predefined time period, and transmitting the downlink signal from the processing circuitry of the stylus to the touch driving circuitry of the touch display device based on the adjusted starting time.

Aspects of the disclosure provides an apparatus for clock synchronization between a touch display device and a stylus. The apparatus includes processing circuitry that determines an accumulated timing error between touch driving circuitry of the touch display device and processing circuitry of the stylus based on crystal inaccuracies of the touch display device and the stylus, connection interval of Bluetooth communication between the touch display device and the stylus, a number of consecutive failed transmissions of the Bluetooth communication. The processing circuitry determines a total processing delay based on a first processing delay and a second processing delay. The first processing delay is a time difference between a sending time of sending a synchronization signal from the touch driving circuitry of the touch display device and a receiving time of receiving the synchronization signal by Bluetooth circuitry of the touch display device. The second processing delay is a time difference between a sending time of sending a Bluetooth packet from the Bluetooth circuitry of the touch display device and a receiving time of receiving the Bluetooth packet by Bluetooth circuitry of the stylus. The processing circuitry determines a tolerance specification of the clock synchronization based on the accumulated timing error and the total processing delay, wherein the clock synchronization is performed based on the tolerance specification.

In an embodiment, the processing circuitry determines the accumulated timing error based on a third processing delay between a first successful Bluetooth transmission from another device to the stylus and a second successful Bluetooth transmission from the touch display device to the stylus. The first successful Bluetooth transmission is received by the stylus after the consecutive failed transmissions and before the second successful Bluetooth transmission.

In an embodiment, the processing circuitry calculates a first product of the connection interval and the number of consecutive failed transmissions of the Bluetooth communication, calculates a first sum of the first product and the third processing delay, calculates a second sum of the crystal inaccuracies of the touch display device and the stylus, and determines the accumulated timing error as a second product of the first sum and the second sum.

In an embodiment, the processing circuitry determines the total processing delay as a sum of the first processing delay and the second processing delay.

In an embodiment, the tolerance specification is determined to be greater than both of the accumulated error and the total processing delay.

In an embodiment, the processing circuitry instructs the stylus to perform the clock synchronization under the tolerance specification.

In an embodiment, the processing circuitry informs at least one of the stylus or the touch display device of the tolerance specification.

In an embodiment, the clock synchronization is performed by determining a time period based on a starting time of a last connection event of the Bluetooth communication and the receiving time of receiving the synchronization signal by the Bluetooth circuitry of the touch display device, determining a number of connection events of the Bluetooth communication that have been transmitted from the Bluetooth circuitry of the touch display device to the Bluetooth circuitry of the stylus until the Bluetooth circuitry of the touch display device receives the synchronization signal, and sending the time period and the number of connection events of the Bluetooth communication from the Bluetooth circuitry of the touch display device to the Bluetooth circuitry of the stylus within a next connection event of the Bluetooth communication.

In an embodiment, in response to the time period being successfully received by the Bluetooth circuitry of the stylus, the clock synchronization is performed by determining a timestamp based on the time period and the receiving time of receiving the Bluetooth packet by the Bluetooth circuitry of the stylus, sending the timestamp from the Bluetooth circuitry of the stylus to the processing circuitry of the stylus, determining an adjusted starting time of a downlink signal based on the timestamp and a predefined time period, and transmitting the downlink signal from the processing circuitry of the stylus to the touch driving circuitry of the touch display device based on the adjusted starting time.

In an embodiment, the predefined time period is determined based on the connection interval of the Bluetooth communication and a frequency of the synchronization signal.

In an embodiment, a frequency of the downlink signal is the same with a frequency of the synchronization signal.

In an embodiment, in response to the time period not being successfully received by the Bluetooth circuitry of the stylus, the clock synchronization is performed by transmitting a downlink signal from the processing circuitry of the stylus to the touch driving circuitry of the touch display device based on a last synchronization.

Aspects of the disclosure provides a non-transitory computer-readable medium storing instructions, which when executed by an apparatus, cause the apparatus to perform a method for clock synchronization between a touch display device and a stylus. The method includes determining an accumulated timing error between touch driving circuitry of the touch display device and processing circuitry of the stylus based on crystal inaccuracies of the touch display device and the stylus, connection interval of Bluetooth communication between the touch display device and the stylus, a number of consecutive failed transmissions of the Bluetooth communication. The method includes determining a total processing delay based on a first processing delay and a second processing delay. The first processing delay is a time difference between a sending time of sending a synchronization signal from the touch driving circuitry of the touch display device and a receiving time of receiving the synchronization signal by Bluetooth circuitry of the touch display device. The second processing delay is a time difference between a sending time of sending a Bluetooth packet from the Bluetooth circuitry of the touch display device and a receiving time of receiving the Bluetooth packet by Bluetooth circuitry of the stylus. The method includes determining a tolerance specification of the clock synchronization based on the accumulated timing error and the total processing delay, wherein the clock synchronization is performed based on the tolerance specification.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The detailed description set forth below in connection with the appended drawings is intended as a description of various configurations and is not intended to represent the only configurations in which the concepts described herein may be practiced. The detailed description includes specific details for the purpose of providing an understanding of various concepts. However, these concepts may be practiced without these specific details.

Several aspects of a touch sensing system will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
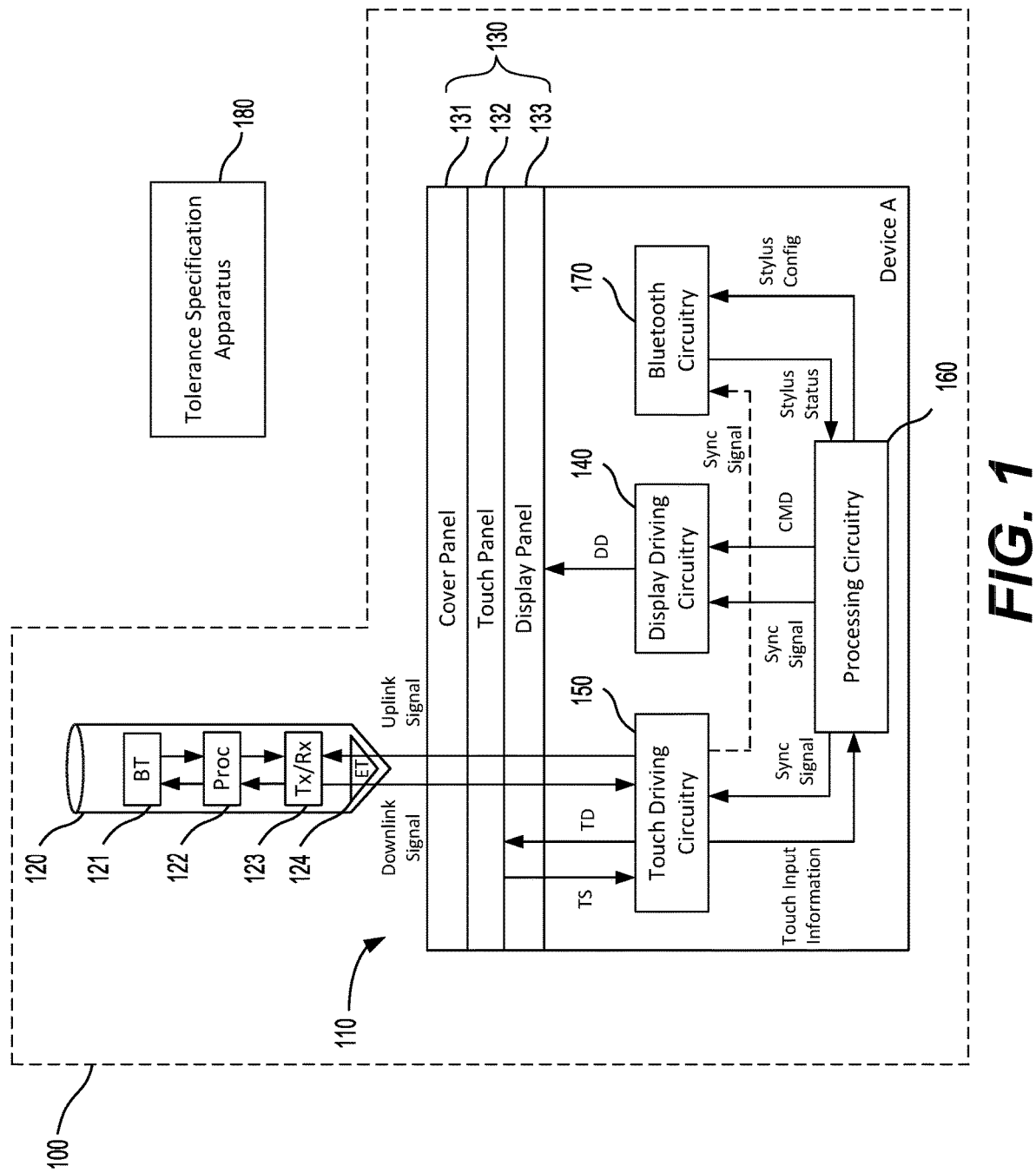
FIG. 1 shows a touch sensing system according to embodiments of the disclosure.

FIG. 1 shows a touch sensing system 100 and a tolerance specification apparatus 180 for determining a tolerance specification of the touch sensing system 100 according to embodiments of the disclosure. The touch sensing system 100 can include a touch display (or touch sensing) device 110 and a stylus (or a pen) 120 that cooperates with the touch display device 110. The touch display device 110 can provide an image (or video) display function to display an image (or video) and a touch sensing function to receive input information or commands from a finger, the stylus 120, or the like. The touch display device 110 can be, for example, a television (TV), a monitor, or a mobile device such as a tablet or a smart phone.

According to aspects of the disclosure, the touch display device 110 can include a touchscreen 130, display driving circuitry 140, touch driving circuitry 150, processing circuitry 160, and Bluetooth circuitry 170. In an example, each circuitry can include a separate integrated circuit chip. For example, the display driving circuitry 140 can include a display driver integrated circuit (DDIC) chip, the touch driving circuitry 150 can include a touch integrated circuit (TIC) chip, the processing circuitry 160 can include a central processing unit (CPU) chip, and the Bluetooth circuitry 170 can include a Bluetooth integrated circuit chip. In an example, a subset or all of the circuitry can be implemented in a system-on-chip (SoC).

The touchscreen 130 can include a cover panel 131, a touch panel 132, and a display panel 133.

The cover panel 131 can include a transparent material and be used for protecting the touch panel 132 and the display panel 133. In an example, the cover panel 131 can include a glass or a plastic material.

The touch panel 132 can include a plurality of touch sensors that senses a touch input from a user. In an example, the plurality of touch sensors can be capacitive touch sensors. In an example, the touch input can be a direct contact of a conductive object (e.g., the user's finger, the user's palm, a touch pen, a passive pen, an active pen, and the like) on the touchscreen 130. In an example, the touch input can be an indirect contact of the conductive object that is in proximity of the touchscreen 130.

The display panel 130 can be any type of display panels such as a light-emitting diode (LED) display panel, an organic LCD (OLED) display panel, an active-matrix OLED (AMOLED) display panel, a liquid crystal display (LCD) panel, a field emission display (FED) panel, a plasma display panel (PDP), an electrophoretic display (EPD) panel, or the like.

It is noted that a location of the touch panel 132 relative to the display panel 133 is not limited in this disclosure. In an example such as FIG. 1, the touch panel 132 can be on top of the display panel 133. In another example, the touch panel 132 can be underneath the display panel 133.

The display driving circuitry 140 can drive the display panel 133 to perform the image display function of the touch display device 110. The display driving circuitry 140 can receive a command signal from the processing circuitry 160 based on image data to be displayed and send a display driving signal DD to the display panel 133 during a display driving period.

The touch driving circuitry 150 can drive and sense the touch panel 132 to perform the touch sensing function of the touch display device 110. The touch driving circuitry 150 can send a touch driving signal TD during a touch driving period to the touch panel 132 and receive from the touch panel 132 a touch sensing signal TS that senses charge variations of the plurality of touch sensors of the touch panel 132. By analyzing the charge variations of the plurality of touch sensors, the touch driving circuitry 150 can determine presence or absence of a touch input and obtain touch input information (e.g., position information and/or tilt information) of the touch input if present. The touch input information of the touch input can be sent back to the processing circuitry 160 for further processing.

In an embodiment, the touch driving signal TD and the display driving signal DD need to be synchronized with each other in order to avoid a flicker issue of the display panel 130. The display driving signal DD can include a vertical synchronization signal Vsync, a horizontal synchronization signal Hsync, and the like. Accordingly, the touch driving signal TD needs to be synchronized with the vertical synchronization signal Vsync for example.

The Bluetooth circuitry 170 can be used for pairing the touch display device 110 to the stylus 120 via a Bluetooth connection when the Bluetooth function of the touch display device 110 is turned on and the stylus 120 is within a Bluetooth connection range (e.g., around 10 m) of the touch display device 110. After the Bluetooth pairing succeeds, the stylus 120 can store an identity of the touch display device 110, such as a media access control (MAC) address of the touch display device 110.

In an embodiment, stylus configuration information of the stylus 120 can be sent from the touch display device 110 to the stylus 120 via the Bluetooth connection. The stylus configuration information can include various settings (e.g., erase setting or ink setting) of the stylus 120.

In an embodiment, stylus status information of the stylus 120 can be sent from the stylus 120 to the touch display device 110 via the Bluetooth connection. The stylus status information can include battery information and pressure information of the stylus 120 for example.

According to aspects of the disclosure, the stylus 120 can include Bluetooth circuitry (BT) 121, processing circuitry (Proc) 122, transmitting/receiving circuitry (Tx/Rx) 123, and an electrode (ET) 124. In an example, each circuitry can include a separate integrated circuit chip. For example, the Bluetooth circuitry 121 can include a Bluetooth integrated circuit chip, the processing circuitry 122 can include a microcontroller (MCU) chip, and the transmitting/receiving circuitry 123 can include a communication integrated circuit chip. In an example, a subset or all of the circuitry can be implemented in a system-on-chip (SoC).

The Bluetooth circuitry 121 can be used for pairing the stylus 120 to the touch display device 110 or any other device having a Bluetooth function. In an embodiment, the stylus 120 can use a Bluetooth low energy (BLE) technology to pair with a device such as the touch display device 110.

The processing circuitry 122 can receive data from the Bluetooth circuitry 121 and/or the transmitting/receiving circuitry 123, process the data, and send commands to the Bluetooth circuitry 121 and/or the transmitting/receiving circuitry 123 based on the processed data.

The transmitting/receiving circuitry 123 can set up (or establish) a bidirectional communication with touch driving circuitry of a touch display device (e.g., the touch driving circuitry 150 of the touch display device 110), when a distance between the stylus 120 and a touchscreen of the touch display device (e.g., the touchscreen 130 of the touch display device 110) is within a communication range (e.g., within 3 cm) of the bidirectional communication. The bidirectional communication can enable the stylus 120 and the touch display device 110 to enter into a stylus operation mode and a stylus scan mode, respectively, so that the stylus 120 can send a touch input to the touch display device 110, and the touch display device 110 can receive the touch input from the stylus 120.

According to aspects of the disclosure, the touch driving circuitry 150 can bi-directionally communicate with the stylus 120. For example, a signal provided from the touch driving circuitry 150 to the stylus 120 can be referred to as an uplink signal, and a signal provided from the stylus 120 to the touch driving circuitry 150 can be referred to as a downlink signal. The bi-directional communication can be performed through a capacitive coupling for example.

For the stylus 120 to reliably work with the touch display device 110, a clock of the downlink signal, which can be referred to as a transmitting (TX) clock of the stylus 120, needs to be synchronized with a clock of the touch driving signal TD of the touch driving circuitry 150, which can be referred to as a TD clock of the touch driving circuitry 150. However, in some cases, the TX clock of the stylus 120 may be asynchronized with the TD clock of the touch driving circuitry 150. The asynchronization can manifest as a timing error between the downlink signal (or TX signal) of the stylus 120 and the TD signal of the touch driving circuitry 150.

The tolerance specification apparatus 180 can determine a tolerance specification of the clock synchronization between the touch display device 110 and the stylus 120 in the touch sensing system 100. In an example, the tolerance specification apparatus 180 can be a computing system (e.g., computer system 800 in FIG. 8), which can be a mobile device such as a smart phone or a tablet, a personal computer, a server, a cloud data processing system, or the like.

The tolerance specification apparatus 180 can obtain specification parameters of a touch sensing system (e.g., the touch sensing system 100) through a user input, a wire transmission, a wireless transmission, or the like. In an example, the tolerance specification apparatus 180 can obtain the specification parameters through a manual input from a user, by using a keyboard for example. In an example, the tolerance specification apparatus 180 can obtain the specification parameters through a network interface (e.g., wireline or wireless interface).

The specification parameters of the touch sensing system 100 can include crystal inaccuracies of the touch display device 110 and the stylus 120, connection interval of Bluetooth communication between the touch display device 110 and the stylus 120, and a number of consecutive failed transmissions of the Bluetooth communication. The specification parameters of the touch sensing system 100 can also include a time difference between a sending time of sending a synchronization signal from the touch driving circuitry 150 of the touch display device 110 and a receiving time of receiving the synchronization signal by the Bluetooth circuitry 170 of the touch display device 110, and a time difference between a sending time of sending a Bluetooth packet from the touch display device 110 and a receiving time of receiving the Bluetooth packet by the stylus 120. The specification parameters of the touch sensing system 100 can further include a processing delay between a first successful Bluetooth transmission from another device to the stylus 120 and a second successful Bluetooth transmission from the touch display device 110 to the stylus 120.

After obtaining the specification parameters of the touch sensing system 100, the tolerance specification apparatus 180 can determine the tolerance specification of the clock synchronization based on an accumulated timing error between the touch display device 110 and the stylus 120 and a total processing delay. The tolerance specification apparatus 180 can determine the accumulated timing error based on crystal inaccuracies of the touch display device 110 and the stylus 120, connection interval of Bluetooth communication between the touch display device 110 and the stylus 120, a number of consecutive failed transmissions of the Bluetooth communication. The tolerance specification apparatus 180 can determine the total processing delay based on a first processing delay and a second processing delay. The first processing delay is a time difference between a sending time of sending a synchronization signal from the touch driving circuitry 150 of the touch display device 110 and a receiving time of receiving the synchronization signal by the Bluetooth circuitry 170 of the touch display device 110. The second processing delay is a time difference between a sending time of sending a Bluetooth packet from the touch display device 110 and a receiving time of receiving the Bluetooth packet by the stylus 120. The clock synchronization can be performed based on the tolerance specification.

After the tolerance specification of the clock synchronization is determined, the tolerance specification apparatus 180 can indicate or instruct the stylus 120 to perform the clock synchronization with the touch display device 110 under the determined tolerance specification.

In an embodiment, the tolerance specification apparatus 180 can inform the stylus 120 and/or the touch display device 110 of the determined tolerance specification. In an example, the tolerance specification apparatus 180 can send the determined tolerance specification to the stylus 120 via wireless communications such as Bluetooth or Wi-Fi. In an example, the tolerance specification apparatus 180 can send the determined tolerance specification to the touch display device 110 via wireline (e.g., USB) or wireless communication (e.g., Bluetooth or Wi-Fi), and then the touch display device 110 can forward the determined tolerance specification to the stylus 120 via Bluetooth or bi-directional communication. After receiving the determined tolerance specification, the stylus 120 can perform the clock synchronization under the determined tolerance specification. Once the clock synchronization is successfully performed, the stylus 120 can seamlessly cooperate with the touch display device 110.

In an embodiment, the tolerance specification apparatus 180 can determine the accumulated timing error based on a third processing delay between a first successful Bluetooth transmission from another device to the stylus 120 and a second successful Bluetooth transmission from the touch display device 110 to the stylus 120. The first successful Bluetooth transmission is received by the stylus 120 after the consecutive failed transmissions and before the second successful Bluetooth transmission.

In an embodiment, the tolerance specification apparatus180 can calculate a first product of the connection interval and the number of consecutive failed transmissions of the Bluetooth communication, calculate a first sum of the first product and the third processing delay, calculate a second sum of the crystal inaccuracies of the touch display device 110 and the stylus 120, and determine the accumulated timing error as a second product of the first sum and the second sum.

In an embodiment, the tolerance specification apparatus 180 can determine the total processing delay as a sum of the first processing delay and the second processing delay.

In an embodiment, the tolerance specification can be determined to be greater than both of the accumulated error and the total processing delay.

Figure 2:
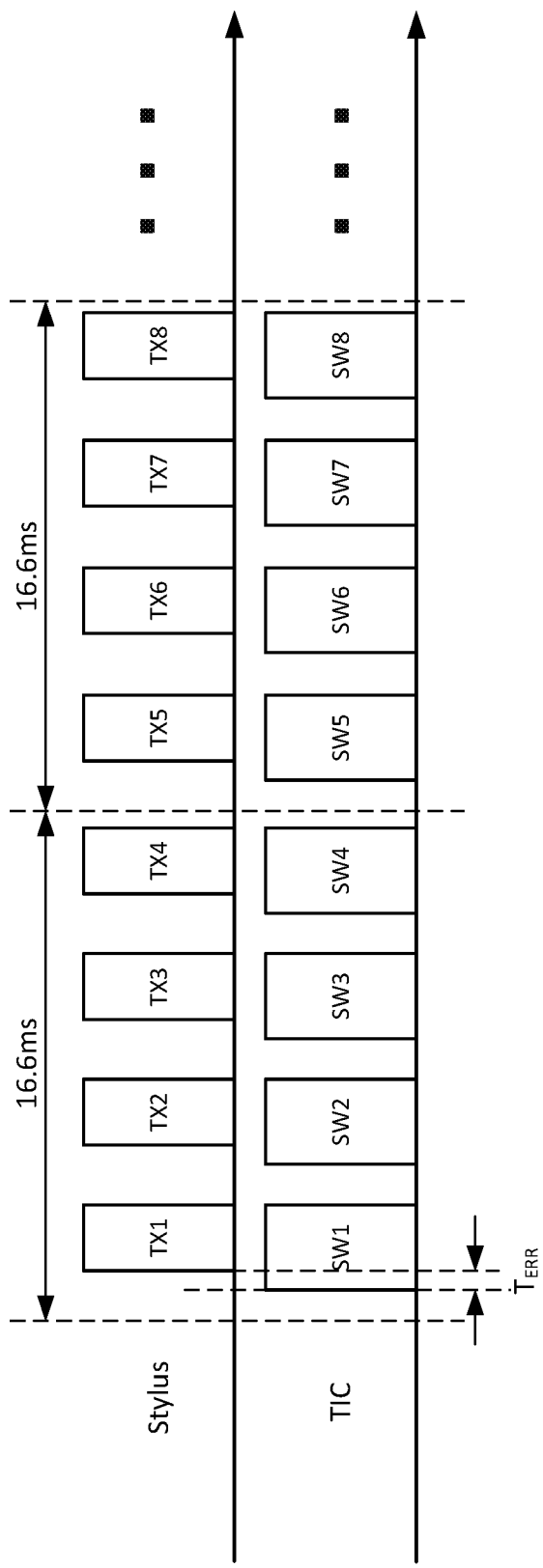
FIG. 2 shows a timing diagram illustrating a timing error between a transmitting (TX) clock of a stylus and a touch driving (TD) clock of a touch integrated circuit (TIC) according to embodiments of the disclosure.

FIG. 2 shows a timing diagram 200 illustrating the timing error between the TX clock of the stylus 120 and the TD clock of the touch driving circuitry 150 of the touch display device 110 according to embodiments of the disclosure. The timing error, which is represented as $T_{ERR}$ in the timing diagram 200, can reduce an effective sensing duration of a sensing window (SW) and thus the signal-to-noise ratio (SNR) of the touch driving circuitry 150.

In the universal stylus initiatives (USI) protocol, the TX clock of the stylus 120 and the TD clock of the touch driving circuitry 150 are synchronized through a beacon signal that is emitted from the touch sensors of the touchscreen to the stylus 120. When the stylus 120 approaches the touchscreen, the stylus 120 may receive the beacon signal and then establish the synchronization with the touch driving circuitry 150. However, this mechanism can pose challenges such as battery life reduction of the touch display device 110 due to continuous beacon scan, display artifacts caused by the beacon signal (which can be considered as a noise source due to the proximity of the touch sensors to the display thin-film transistor (TFT) layer, for example, in a POLED stack-up), and the like.

One solution to address the above issues is to use Bluetooth low-energy (BLE) for timing synchronization. However, there are still some challenges impacting the accuracy of the timing synchronization.

One challenge is BLE data processing jitters. A BLE IC (or BLE controller or Bluetooth circuitry) can take a certain time to process, pack, and transfer the data. If there are interrupts from another connected device during this procedure, such as ear buds or another peripheral, the procedure can be delayed. In a multi-device case, such interrupts are unpredictable, and can increase the processing jitters.

Another challenge is BLE retransmission and delay. In an example, a first BLE packet can be lost during BLE communication between a stylus (e.g., the stylus 120) and a touch display device (110), or a cyclic redundancy check (CRC) check can fail after the stylus receives the first BLE packet. In such an example, a BLE IC of the touch display device can retransmit the first BLE packet within a next connection event of the BLE communication. In addition, during the transmission of the first BLE packet, if there is a second BLE packet coming from another device and a processing priority of the second BLE packet is higher than that of the first BLE packet, the stylus can process the second BLE packet with the higher priority before processing the first BLE packet, and thus the delivery of the first BLE packet can be delayed.

Figure 3:
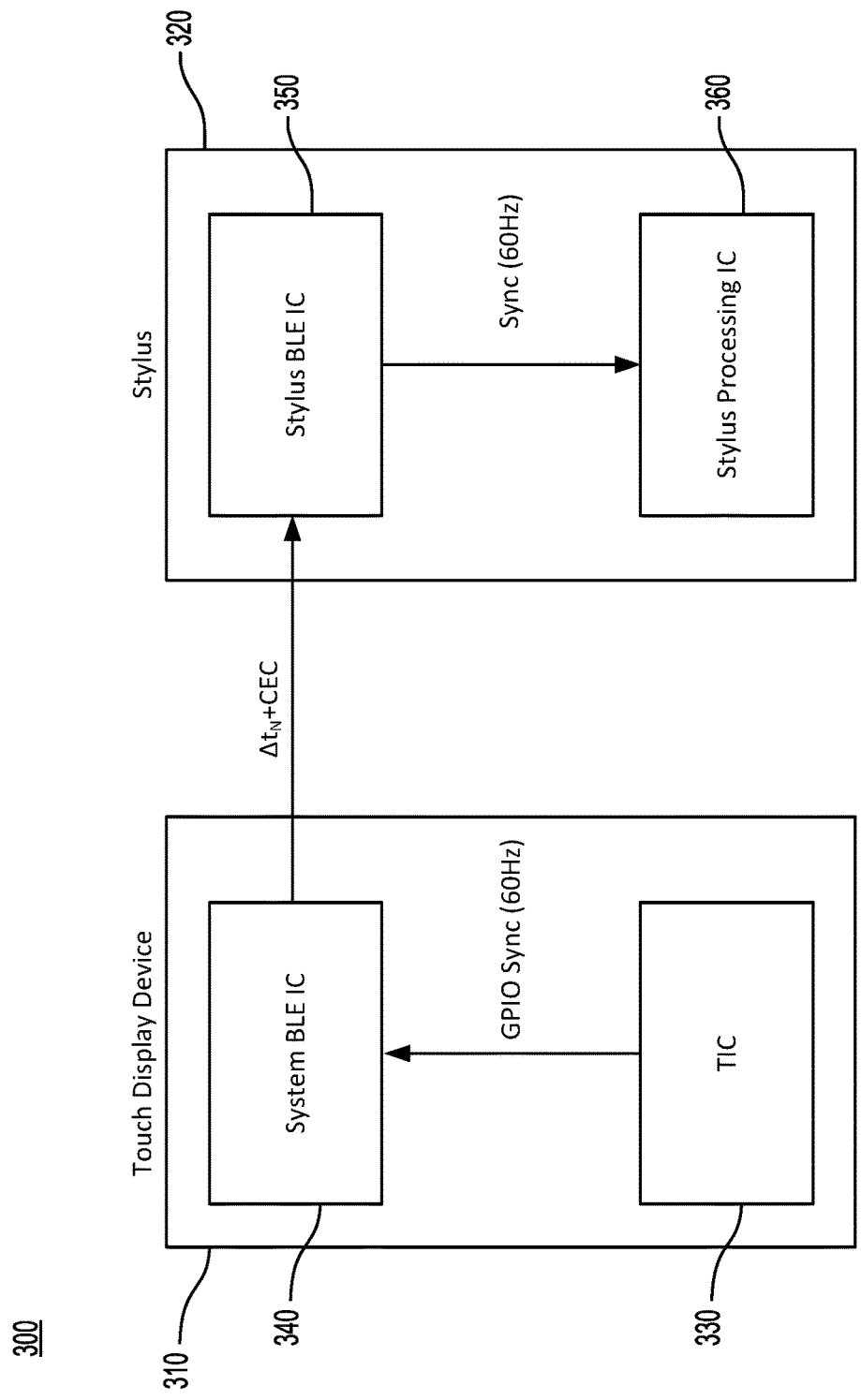
FIG. 3 shows an architecture using Bluetooth for timing synchronization according to embodiments of the disclosure.

FIG. 3 shows an architecture 300 using Bluetooth for timing synchronization according to embodiments of the disclosure. The architecture 300 can include a touch display device 310 and a stylus 320, which can be the touch display device 110 and the stylus 120 in FIG. 1, respectively. Data to be synchronized can be initiated by a TIC 330 of the touch display device 310 and sent through, for example, a general purpose input/output (GPIO) toggle signal (e.g., at a frequency of 60 Hz), to a BLE IC 340 of the touch display device 310, which can be referred to as system BLE IC 340 in this disclosure. The system BLE IC 340 can calculate and send a time period $\Delta t_N$ to a BLE IC 350 of the stylus 320, which can be referred to as stylus BLE IC 350. The time period $\Delta t_N$ is a time difference between a receiving time of receiving by the system BLE IC 340 a synchronization signal sent from the TIC 330 and a starting time of a BLE connection signal (or connection event) of BLE communication between the system BLE IC 340 and the stylus BLE IC 350. Based on the time period $\Delta t_N$, the stylus BLE IC 350 can calculate and send a timestamp $t_N$ to a stylus processing IC 360 (or stylus processing circuitry) of the stylus 320. Based on the timestamp $t_N$, the stylus processing IC 360 can adjust a starting time of a TX signal to align with a starting time of a sensing window of the TIC 330 for each frame, effectively reducing the time error Terr.

Figure 4:
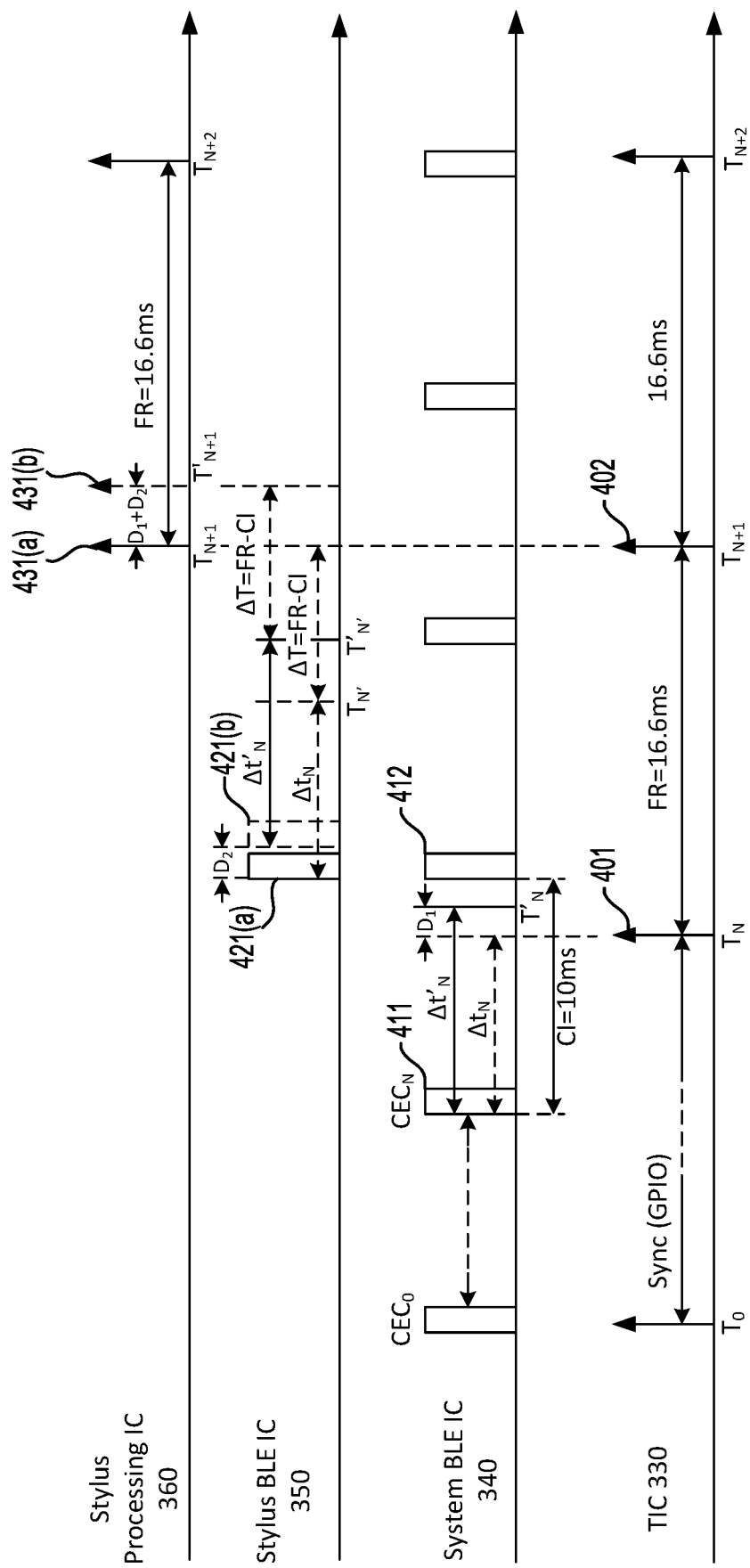
FIG. 4 shows a timing synchronization diagram of the Bluetooth timing synchronization architecture according to embodiments of the disclosure.

FIG. 4 shows a timing synchronization diagram 400 of the Bluetooth timing synchronization architecture 300 according to embodiments of the disclosure. As shown in FIG. 4, at time $T_N$, the system BLE IC 340 can receive a synchronization signal 401 sent from the TIC 330. The system BLE IC 340 can calculate a time period $\Delta t_N$ between a receiving time of receiving the synchronization signal 401 and a starting time of a last connection event 411 of the BLE communication between the touch display device 310 and the stylus 320. Then, the system BLE IC 340 can send the time period $\Delta t_N$ along with a connection event count $CEC_N$ to the stylus BLE IC 350 through a BLE packet within a next connection event 412 of the BLE communication. The $CEC_N$ is a number of connection events of the BLE communication that the system BLE IC 340 has been sent to the stylus BLE IC 350 until the stylus BLE IC 350 receives the next connection event 412.

The stylus BLE IC 350 can receive the time period $\Delta t_N$ through the BLE packet within a connection event 421(a) corresponding to the connection event 412. Based on the received time period $\Delta t_N$, the stylus BLE IC 350 can calculate a timestamp $T_{N'}$ and send the timestamp $T_{N'}$ to the stylus processing IC 360. Based on the timestamp $T_{N'}$, the stylus processing IC 360 can adjust a starting time of a TX signal 431(a) to align with a next synchronization signal 402 of the TIC 330. An amount of time adjustment can be represented as $\Delta T=FR-CI$, where FR is a frame rate (e.g., 16.6 ms) of the TIC 330 and CI is a connection interval (e.g., 10 ms) of the BLE communication between the system BLE IC 340 and the stylus BLE IC 350. It is noted that the FR and/or CI can vary depending on the system requirement. Accordingly, the TX signal 431(a) can align with the next synchronization signal 402 at time $T_{N+1}$.

According to aspects of the disclosure, a processing time delay (or jitter) may occur for a BLE IC (e.g., the system BLE IC 340 or the stylus BLE IC 350) to receive a signal (e.g., the synchronization signal 401 or the BLE packet within the connection event 412). In FIG. 4, the processing time delays for the system BLE IC 340 and the stylus BLE IC 350 to receive the synchronization signal 401 and the time period can be represented as $D_1$ and $D_2$, respectively.

Due to the processing time delay $D_1$, the system BLE IC 340 can receive the synchronization signal 401 at time $T'_N$, and the time period between the receiving time of receiving the synchronization signal 401 and the starting time of the connection event 411 can be represented as $\Delta t'_N=\Delta t_N+D_1$. The system BLE IC 340 can send the time period $\Delta t'_N$ to the stylus BLE IC 350 through the BLE packet within the next connection event 412.

Due to the processing time delay $D_2$, the stylus BLE IC 350 can receive the time period $\Delta t'_N$ through the BLE packet within a connection event 421(b) corresponding to the connection event 412, where the processing time delay $D_2$ is a time difference between a starting time of the connection event 421(b) and a starting time of the connection event 412. Once receiving the time period $\Delta t'_N$, the stylus BLE IC 350 can calculate a timestamp $T'_N$, and send the timestamp $T'_N$ to the stylus processing IC 360. By adding the amount of time adjustment $\Delta T=FR-CI$ to the timestamp $T'_N$, the stylus processing IC 360 can adjust a starting time of a downlink signal 431(b). Accordingly, it can be seen that the synchronization between the downlink signal 431(b) and the synchronization signal 402 can be skewed by a total processing delay $D_{TOT}=D_1+D_2$ and this skew can appear at each frame once the stylus 320 determines that the synchronization is successful.

If a transmission between the stylus BLE IC 350 and the system BLE IC 340 fails, i.e., a BLE packet transfer between the stylus BLE IC 350 and the system BLE IC 340 fails, a retransmission can be executed. If the transmission keeps failing, the retransmission can continue until the BLE packet transfer succeeds.

Figure 5:
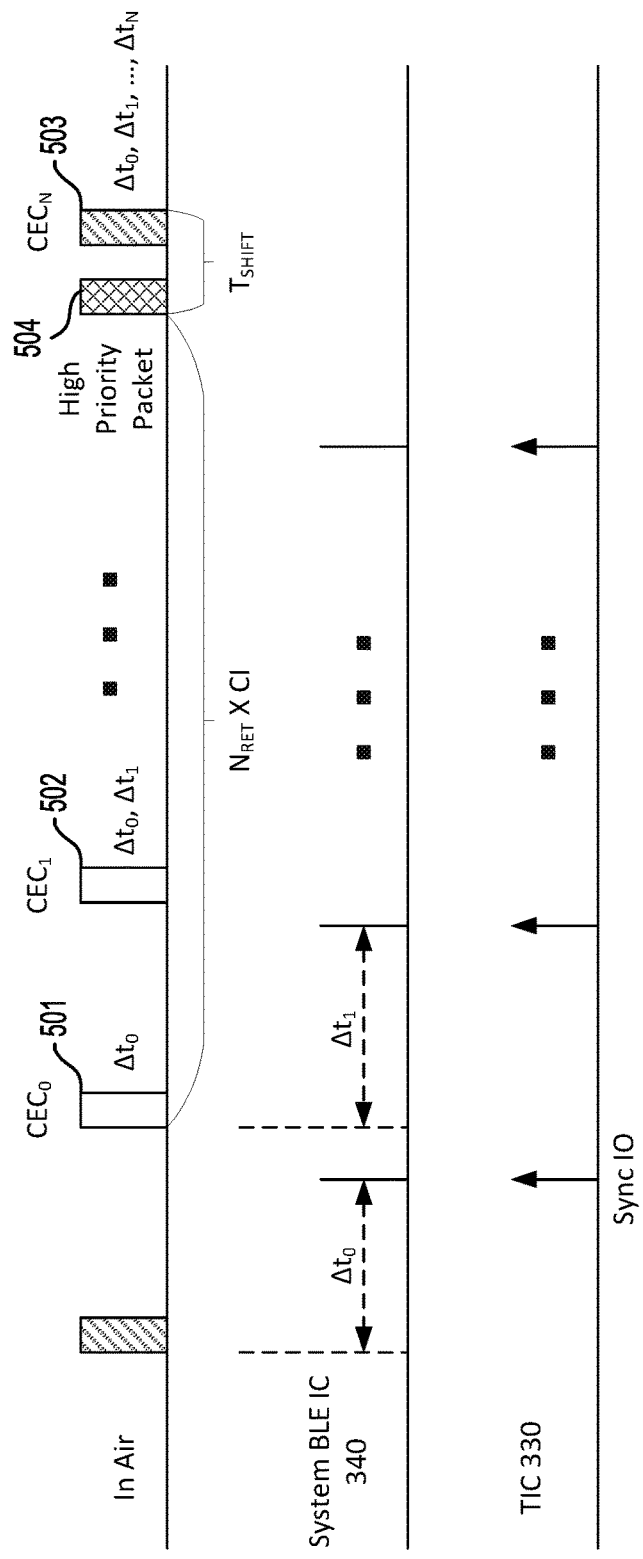
FIG. 5 shows a Bluetooth retransmission timing diagram of the Bluetooth timing synchronization architecture according to embodiments of the disclosure.

FIG. 5 shows a BLE retransmission timing diagram 500 of the Bluetooth timing synchronization architecture 300 according to embodiments of the disclosure. In FIG. 5, the BLE communication (e.g., connection events 501 and 502) between the system BLE IC 340 and the stylus BLE IC 350 keeps failing until the BLE packet transfer within a connection event 503 succeeds. A number of consecutive failed transmissions can be represented as $N_{RET}$, and thus a total retransmission time can be represented as $N_{RET} \times CI$. In addition, a high-priority packet can be processed before the BLE packet within the connection event 503 is successfully transferred, and a processing delay due to the high-priority packet can be represented as $T_{SHIFT}$. During the retransmission, the stylus processing IC 360 can keep sending the downlink signal based on a last good synchronization. Therefore, a timing error between the stylus processing IC 360 and the TIC 330 can accumulate. The accumulated timing error can be represented as $ACCU_{ERR}=XTAL_{PPM} \times (N_{RET} \times CI + T_{SHIFT})$, where $XTAL_{PPM}$ represents a total crystal inaccuracy (e.g., a sum of crystal inaccuracies of the TIC 330 and the Stylus processing IC 360).

To correct the $ACCU_ERR$, a latest CEC can be sent along with a latest $\Delta t$ through the BLE packet, in order to re-establish the synchronization based on the latest $\Delta t$ that was successfully transmitted. It is noted that when the BLE packet is successfully delivered in the connection event 503, the CECs (e.g., $CEC_0, CEC_1, \ldots, CEC_{N-1}$) and time periods $\Delta t$ (e.g., $\Delta t_0, \Delta t_1, \ldots, \Delta t_{N-1}$) in all previous failed connection events are received by the stylus BLE IC 350 along with the latest CEC and the latest $\Delta t$, which are $CEC_N$ and $\Delta t_N$ in FIG. 5, respectively.

Figure 6:
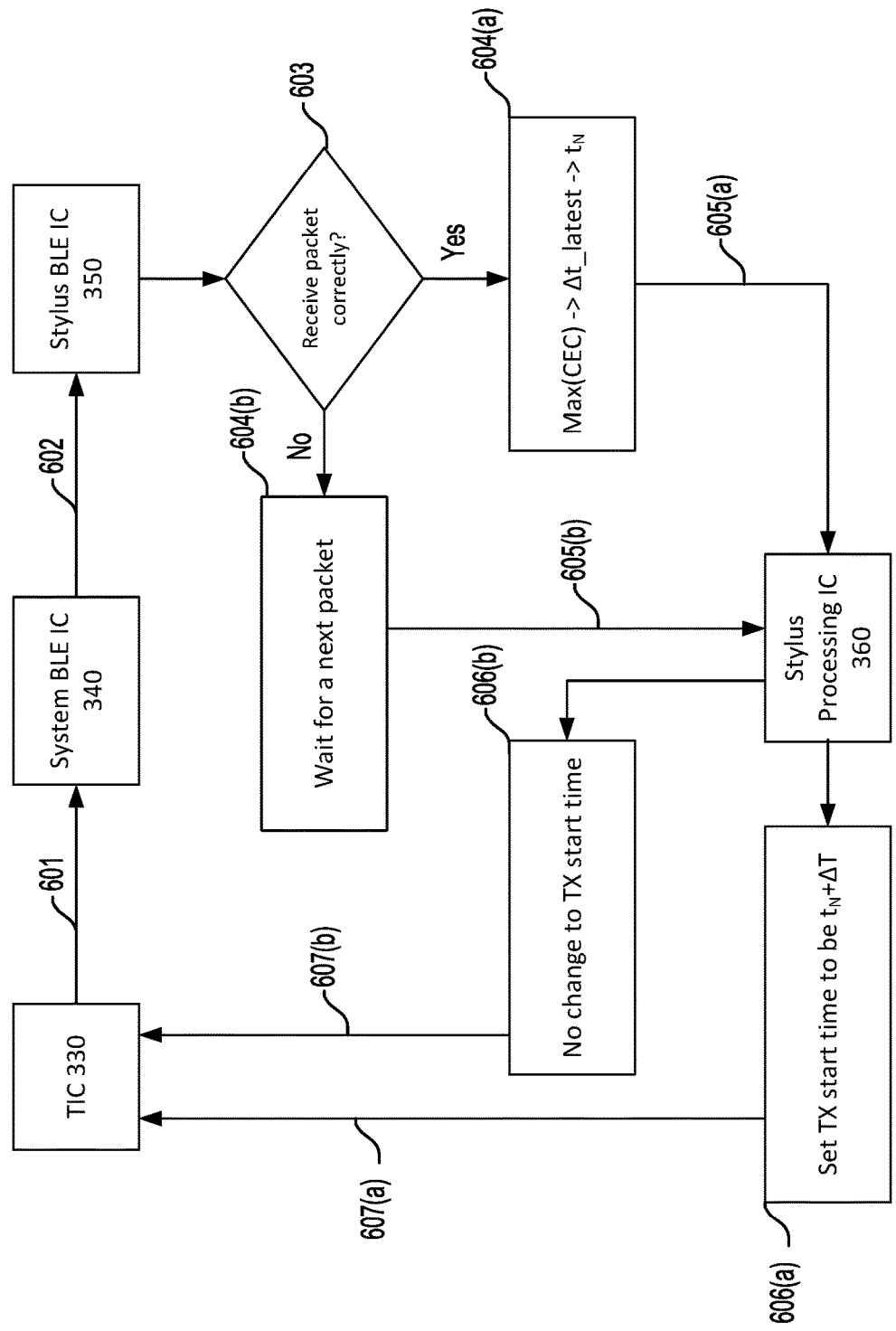
FIG. 6 shows a synchronization procedure of the Bluetooth timing synchronization architecture according to embodiments of the disclosure.

FIG. 6 shows a synchronization procedure 600 of the Bluetooth timing synchronization architecture 300 according to embodiments of the disclosure. At step 601, the TIC 330 of the touch display device 310 can send a synchronization signal (e.g., at 60 Hz) to the system BLE IC 340 of the touch display device 310. The system BLE IC 340 can calculate a time period $\Delta t$, which is a time difference between a starting time of a latest connection event prior to receiving the synchronization signal and a receiving time of receiving the synchronization signal by the system BLE IC 340. Then, at step 602, the system BLE IC 340 can send the time period $\Delta t$ along with a latest CEC to the stylus BLE IC 350 of the stylus 320 through a BLE packet.

At step 603, the system BLE IC 340 can determine whether the BLE packet is received correctly. If the BLE packet is received correctly, at step 604, the stylus BLE IC 350 can find a maximum CEC ($CEC_{MAX}$) among the received one or more CECs. Based on the $CEC_{MAX}$, which is the latest CEC, the stylus BLE IC 350 can determine the time period $\Delta t$ associated with the $CEC_{MAX}$, which is the latest time period $\Delta t\_latest$, and then calculate a timestamp $t_N$ based on the $\Delta t\_latest$. At step 605, the stylus BLE IC 350 can send the timestamp $t_N$ to the stylus processing IC 360.

At step 606, the stylus processing IC 360 can set a starting time of a TX signal to be $t_N+\Delta T$, where $\Delta T=FR-CI$. At step 607, the stylus processing IC 360 can send an adjusted TX signal to a touchscreen of the touch display device 310. If the BLE packet transfer fails, at step 608, the stylus BLE IC 350 can wait for a next BLE packet. Accordingly, the stylus BLE IC 350 does not have to send the time period to the stylus processing IC 360 at step 605(b). The stylus processing IC 360 determines that the starting time of the TX signal is not changed at step 606(b) and continues sending the TX signal based on a last good synchronization at step 607(b).

Figure 7:
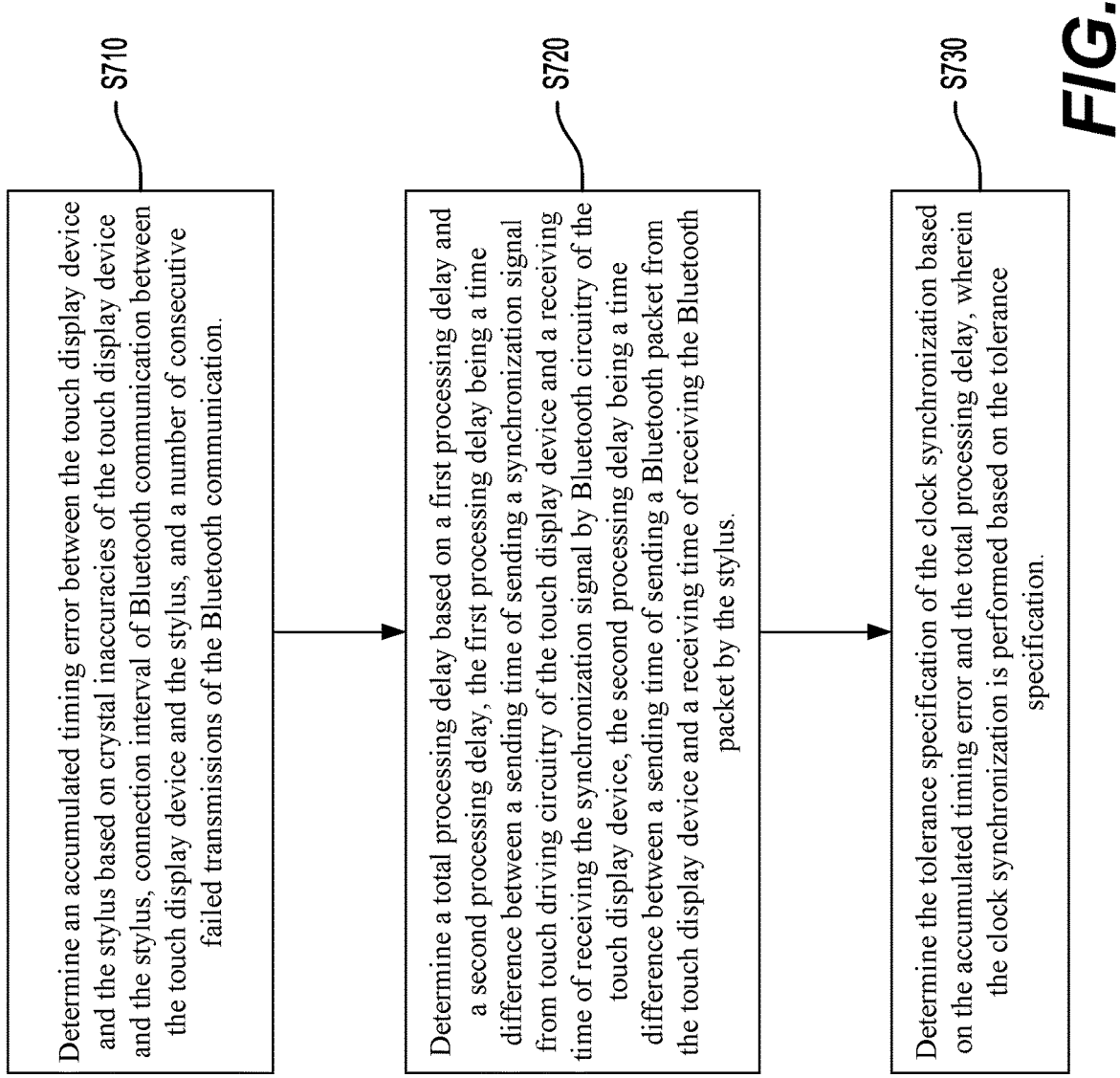
FIG. 7 shows a flowchart illustrating a process of determining a tolerance specification of a clock synchronization between a stylus and a touch display device according to embodiments of the disclosure.

FIG. 7 shows a flowchart outlining a process 700 of determining a tolerance specification of a clock synchronization between a touch display device (e.g., the touch display device 110 or 310) and a stylus (e.g., the stylus 120 or 320) according to embodiments of the disclosure. The process 700 can be performed by the tolerance specification apparatus 180 in FIG. 1 or computer system 800 in FIG. 8. The process 700 can be implemented as computer software using computer-readable instructions that can be performed by one or more processing circuits/circuitry. A processing circuit includes a programmed processor (for example, processor 841), as a processor includes circuitry. A processing circuit may also include devices such as an application specific integrated circuit (ASIC) and conventional circuit components arranged to perform the recited functions. In an embodiment, the processing circuitry may include one or more of CPUs 841, Graphics Processing Units (GPUs) 842, Field Programmable Gate Areas (FPGAs) 843, and accelerators 844 in the computer system 800. The process 700 may start at step S710.

At step S710, the process 700 can determine an accumulated timing error between the touch display device and the stylus based on crystal inaccuracies of the touch display device and the stylus, connection interval of Bluetooth communication between the touch display device and the stylus, and a number of consecutive failed transmissions of the Bluetooth communication. Then, the process 700 can proceed to step S720.

At step S720, the process 700 can determine a total processing delay based on a first processing delay and a second processing delay. The first processing delay is a time difference between a sending time of sending a synchronization signal from touch driving circuitry of the touch display device and a receiving time of receiving the synchronization signal by Bluetooth circuitry of the touch display device. The second processing delay is a time difference between a sending time of sending a Bluetooth packet from the touch display device and a receiving time of receiving the Bluetooth packet by the stylus. Then, the process 700 can proceed to step S730.

At step S730, the process 700 can determine the tolerance specification of the clock synchronization based on the accumulated timing error and the total processing delay. The clock synchronization can be performed based on the tolerance specification. Then, the process 700 can terminate.

In an embodiment, the process 700 can determine the accumulated timing error based on a third processing delay between a first successful Bluetooth transmission from another device to the stylus and a second successful Bluetooth transmission from the touch display device to the stylus. The first successful Bluetooth transmission is received by the stylus after the consecutive failed transmissions and before the second successful Bluetooth transmission.

In an embodiment, the process 700 can calculate a first product of the connection interval and the number of consecutive failed transmissions of the Bluetooth communication, calculate a first sum of the first product and the third processing delay, calculate a second sum of the crystal inaccuracies of the touch display device and the stylus, and determine the accumulated timing error as a second product of the first sum and the second sum.

In an embodiment, the process 700 can determine the total processing delay as a sum of the first processing delay and the second processing delay.

In an embodiment, the tolerance specification can be determined to be greater than both of the accumulated error and the total processing delay.

According to aspects of the disclosure, a tolerance specification ($TOL_{SPEC}$) to timing errors can be determined based on an SNR requirement for a touch display sensing system (e.g., the touch display sensing system 100) and a tolerance of each IC of a BLE timing synchronization architecture (e.g., the BLE timing synchronization architecture 300) to the timing errors. For example, the tolerance specification $TOL_{SPEC}$ should be greater than or equal to the accumulated timing error $ACCU_{ERR}$, in order to ensure that a stylus processing IC (e.g., the stylus processing IC 360) can still correctly cooperate with a TIC (e.g., the TIC 330) when the stylus processing IC is off synchronized with the TIC. Further, the $TOL_{SPEC}$ should be greater than or equal to the total processing delay $D_{TOT}$, in order to ensure that the synchronization between the stylus processing IC and the TIC succeeds.

In an example, crystals with 100 ppm are used on both the stylus and TIC. In the worst case, the crystals are drifting in opposite directions, and thus $XTAL_{PPM}$=200 ppm. If CI=15 ms, $N_{RET}$=20 frames, and $T_{SHIFT}$=10 ms, then the accumulated timing error $ACCU_{ERR}$=62 µs. Accordingly, $TOL_{SPEC}$ can be set around 100 µs for example. The tolerance specification apparatus 180 can instruct the stylus to perform the clock synchronization with the TIC under $TOL_{SPEC}$. For example, the tolerance specification apparatus 180 can inform the stylus and/or the touch display device of $TOL_{SPEC}$.

Aspects of the disclosure provide a method for clock synchronization between a touch display device and a stylus. The method includes determining an accumulated timing error between touch driving circuitry of the touch display device and processing circuitry of the stylus based on crystal inaccuracies of the touch display device and the stylus, connection interval of Bluetooth communication between the touch display device and the stylus, a number of consecutive failed transmissions of the Bluetooth communication. The method includes determining a total processing delay based on a first processing delay and a second processing delay. The first processing delay is a time difference between a sending time of sending a synchronization signal from the touch driving circuitry of the touch display device and a receiving time of receiving the synchronization signal by Bluetooth circuitry of the touch display device. The second processing delay is a time difference between a sending time of sending a Bluetooth packet from the Bluetooth circuitry of the touch display device and a receiving time of receiving the Bluetooth packet by Bluetooth circuitry of the stylus. The method includes determining a tolerance specification of the clock synchronization based on the accumulated timing error and the total processing delay, wherein the clock synchronization is performed based on the tolerance specification.

In an embodiment, the determining the accumulated timing error includes determining the accumulated timing error based on a third processing delay between a first successful Bluetooth transmission from another device to the stylus and a second successful Bluetooth transmission from the touch display device to the stylus. The first successful Bluetooth transmission is received by the stylus after the consecutive failed transmissions and before the second successful Bluetooth transmission.

In an embodiment, the determining the accumulated timing error includes calculating a first product of the connection interval and the number of consecutive failed transmissions of the Bluetooth communication, calculating a first sum of the first product and the third processing delay, calculating a second sum of the crystal inaccuracies of the touch display device and the stylus, and determining the accumulated timing error as a second product of the first sum and the second sum.

In an embodiment, the determining the total processing delay includes determining the total processing delay as a sum of the first processing delay and the second processing delay.

In an embodiment, the method includes instructing the stylus to perform the clock synchronization under the tolerance specification.

In an embodiment, the method includes informing at least one of the stylus or the touch display device of the tolerance specification.

In an embodiment, the clock synchronization is performed by determining a time period based on a starting time of a last connection event of the Bluetooth communication and the receiving time of receiving the synchronization signal by the Bluetooth circuitry of the touch display device, determining a number of connection events of the Bluetooth communication that have been transmitted from the Bluetooth circuitry of the touch display device to the Bluetooth circuitry of the stylus until the Bluetooth circuitry of the touch display device receives the synchronization signal, and sending the time period and the number of connection events of the Bluetooth communication from the Bluetooth circuitry of the touch display device to the Bluetooth circuitry of the stylus within a next connection event of the Bluetooth communication.

In an embodiment, in response to the time period being successfully received by the Bluetooth circuitry of the stylus, the clock synchronization is performed by determining a timestamp based on the time period and the receiving time of receiving the Bluetooth packet by the Bluetooth circuitry of the stylus, sending the timestamp from the Bluetooth circuitry of the stylus to the processing circuitry of the stylus, determining an adjusted starting time of a downlink signal based on the timestamp and a predefined time period, and transmitting the downlink signal from the processing circuitry of the stylus to the touch driving circuitry of the touch display device based on the adjusted starting time.

In an embodiment, the predefined time period is determined based on the connection interval of the Bluetooth communication and a frequency of the synchronization signal.

In an embodiment, a frequency of the downlink signal is the same with a frequency of the synchronization signal.

In an embodiment, in response to the time period not being successfully received by the Bluetooth circuitry of the stylus, the clock synchronization is performed by transmitting a downlink signal from the processing circuitry of the stylus to the touch driving circuitry of the touch display device based on a last synchronization.

In an embodiment, the clock synchronization is performed by receiving one or more event counts at the Bluetooth circuitry of the stylus, each connection event count being associated with a respective time period, determining a maximum count of the one or more connection event counts, determining the time period associated with the maximum count, determining a timestamp based on the time period, determining an adjusted starting time of a downlink signal based on the timestamp and a predefined time period, and transmitting the downlink signal from the processing circuitry of the stylus to the touch driving circuitry of the touch display device based on the adjusted starting time.

Aspects of the disclosure provide an apparatus for clock synchronization between a touch display device and a stylus. The apparatus includes processing circuitry that determines an accumulated timing error between touch driving circuitry of the touch display device and processing circuitry of the stylus based on crystal inaccuracies of the touch display device and the stylus, connection interval of Bluetooth communication between the touch display device and the stylus, a number of consecutive failed transmissions of the Bluetooth communication. The processing circuitry determines a total processing delay based on a first processing delay and a second processing delay. The first processing delay is a time difference between a sending time of sending a synchronization signal from the touch driving circuitry of the touch display device and a receiving time of receiving the synchronization signal by Bluetooth circuitry of the touch display device. The second processing delay is a time difference between a sending time of sending a Bluetooth packet from the Bluetooth circuitry of the touch display device and a receiving time of receiving the Bluetooth packet by Bluetooth circuitry of the stylus. The processing circuitry determines a tolerance specification of the clock synchronization based on the accumulated timing error and the total processing delay, wherein the clock synchronization is performed based on the tolerance specification.

In an embodiment, the processing circuitry determines the accumulated timing error based on a third processing delay between a first successful Bluetooth transmission from another device to the stylus and a second successful Bluetooth transmission from the touch display device to the stylus. The first successful Bluetooth transmission is received by the stylus after the consecutive failed transmissions and before the second successful Bluetooth transmission.

In an embodiment, the processing circuitry calculates a first product of the connection interval and the number of consecutive failed transmissions of the Bluetooth communication, calculates a first sum of the first product and the third processing delay, calculates a second sum of the crystal inaccuracies of the touch display device and the stylus, and determines the accumulated timing error as a second product of the first sum and the second sum.

In an embodiment, the processing circuitry determines the total processing delay as a sum of the first processing delay and the second processing delay.

In an embodiment, the processing circuitry instructs the stylus to perform the clock synchronization under the tolerance specification.

In an embodiment, the processing circuitry informs at least one of the stylus or the touch display device of the tolerance specification.

In an embodiment, the clock synchronization is performed by determining a time period based on a starting time of a last connection event of the Bluetooth communication and the receiving time of receiving the synchronization signal by the Bluetooth circuitry of the touch display device, determining a number of connection events of the Bluetooth communication that have been transmitted from the Bluetooth circuitry of the touch display device to the Bluetooth circuitry of the stylus until the Bluetooth circuitry of the touch display device receives the synchronization signal, and sending the time period and the number of connection events of the Bluetooth communication from the Bluetooth circuitry of the touch display device to the Bluetooth circuitry of the stylus within a next connection event of the Bluetooth communication.

In an embodiment, in response to the time period being successfully received by the Bluetooth circuitry of the stylus, the clock synchronization is performed by determining a timestamp based on the time period and the receiving time of receiving the Bluetooth packet by the Bluetooth circuitry of the stylus, sending the timestamp from the Bluetooth circuitry of the stylus to the processing circuitry of the stylus, determining an adjusted starting time of a downlink signal based on the timestamp and a predefined time period, and transmitting the downlink signal from the processing circuitry of the stylus to the touch driving circuitry of the touch display device based on the adjusted starting time.

In an embodiment, the predefined time period is determined based on the connection interval of the Bluetooth communication and a frequency of the synchronization signal.

In an embodiment, a frequency of the downlink signal is the same with a frequency of the synchronization signal.

In an embodiment, in response to the time period not being successfully received by the Bluetooth circuitry of the stylus, the clock synchronization is performed by transmitting a downlink signal from the processing circuitry of the stylus to the touch driving circuitry of the touch display device based on a last synchronization.

Aspects of the disclosure provide a non-transitory computer-readable medium storing instructions, which when executed by an apparatus, cause the apparatus to perform a method for clock synchronization between a touch display device and a stylus. The method includes determining an accumulated timing error between touch driving circuitry of the touch display device and processing circuitry of the stylus based on crystal inaccuracies of the touch display device and the stylus, connection interval of Bluetooth communication between the touch display device and the stylus, a number of consecutive failed transmissions of the Bluetooth communication. The method includes determining a total processing delay based on a first processing delay and a second processing delay. The first processing delay is a time difference between a sending time of sending a synchronization signal from the touch driving circuitry of the touch display device and a receiving time of receiving the synchronization signal by Bluetooth circuitry of the touch display device. The second processing delay is a time difference between a sending time of sending a Bluetooth packet from the Bluetooth circuitry of the touch display device and a receiving time of receiving the Bluetooth packet by Bluetooth circuitry of the stylus. The method includes determining a tolerance specification of the clock synchronization based on the accumulated timing error and the total processing delay, wherein the clock synchronization is performed based on the tolerance specification.

The techniques described above, can be implemented as computer software using computer-readable instructions and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more CPUs, GPUs, and the like.

The instructions can be executed on various types of computers or components thereof, including, for example, personal computers, tablet computers, servers, smartphones, gaming devices, internet of things devices, and the like.

Figure 8:
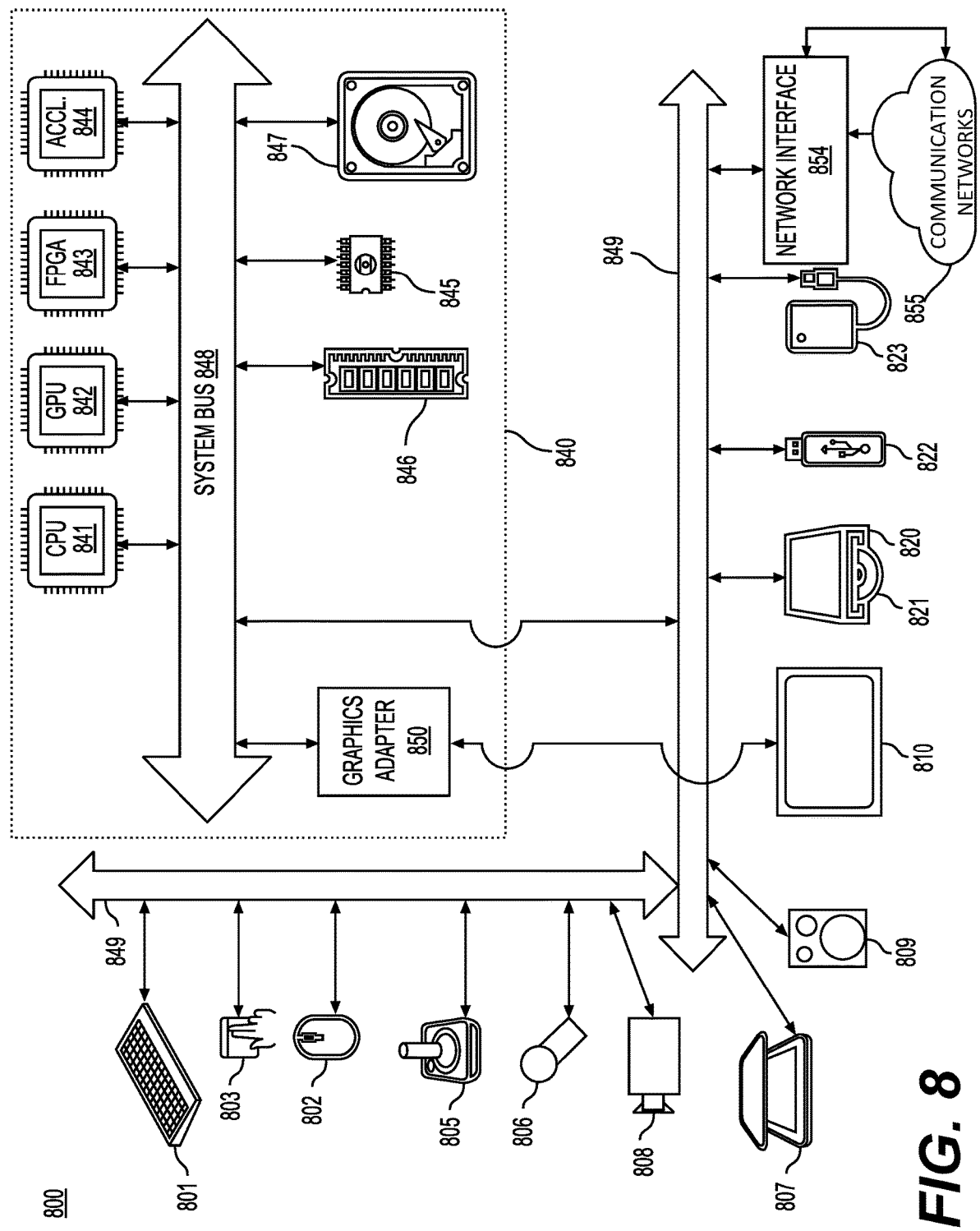
FIG. 8 shows a computer system according to embodiments of the disclosure.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, data-glove (not shown), joystick 805, microphone 806, scanner 807, and camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove (not shown), or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens 810) can be connected to a system bus 848 through a graphics adapter 850.

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include a network interface 854 to one or more communication networks 855. The one or more communication networks 855 can for example be wireless, wireline, optical. The one or more communication networks 855 can further be local, wide-area, metropolitan, vehicular and industrial, real-time, delay-tolerant, and so on. Examples of the one or more communication networks 855 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 849 (such as, for example USB ports of the computer system 800); others are commonly integrated into the core of the computer system 800 by attachment to a system bus as described below (for example Ethernet interface into a PC computer system or cellular network interface into a smartphone computer system). Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800. Each of the functions of the described embodiments can be implemented by the core 840.

The core 840 can include processing circuitry such as one or more CPUs 841, GPUs 842, specialized programmable processing units in the form of FPGAs 843, hardware accelerators for certain tasks 844, graphics adapters 850, and so forth. These devices, along with Read-only memory (ROM) 845, Random-access memory 846, internal mass storage 847 such as internal non-user accessible hard drives, SSDs, and the like, may be connected through the system bus 848. In some computer systems, the system bus 848 can be accessible in the form of one or more physical plugs to enable extensions by additional CPUs, GPUs, and the like. The peripheral devices can be attached either directly to the core's system bus 848, or through a peripheral bus 849. In an example, the screen 810 can be connected to the graphics adapter 850. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800 and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for determining a tolerance specification of a clock synchronization between a touch display device and a stylus, the method comprising:
   determining, by processing circuitry of an apparatus, an accumulated timing error between the touch display device and the stylus based on crystal inaccuracies of the touch display device and the stylus, connection interval of Bluetooth communication between the touch display device and the stylus, and a number of consecutive failed transmissions of the Bluetooth communication;
   determining, by the processing circuitry, a total processing delay based on a first processing delay and a second processing delay, the first processing delay being a time difference between a sending time of sending a synchronization signal from touch driving circuitry of the touch display device and a receiving time of receiving the synchronization signal by Bluetooth circuitry of the touch display device, the second processing delay being a time difference between a sending time of sending a Bluetooth packet from the touch display device and a receiving time of receiving the Bluetooth packet by the stylus; and determining, by the processing circuitry, the tolerance specification of the clock synchronization based on the accumulated timing error and the total processing delay, wherein the clock synchronization is performed based on the tolerance specification.

2. The method of claim 1, wherein the determining the accumulated timing error comprises:

determining, by the processing circuitry, the accumulated timing error based on a third processing delay between a first successful Bluetooth transmission from another device to the stylus and a second successful Bluetooth transmission from the touch display device to the stylus, the first successful Bluetooth transmission being received by the stylus after the consecutive failed transmissions and before the second successful Bluetooth transmission.

3. The method of claim 2, wherein the determining the accumulated timing error comprises:

calculating, by the processing circuitry, a first product of the connection interval and the number of consecutive failed transmissions of the Bluetooth communication;

calculating, by the processing circuitry, a first sum of the first product and the third processing delay;

calculating, by the processing circuitry, a second sum of the crystal inaccuracies of the touch display device and the stylus; and determining, by the processing circuitry, the accumulated timing error as a second product of the first sum and the second sum.

4. The method of claim 1, wherein the determining the total processing delay comprises:

determining, by the processing circuitry, the total processing delay as a sum of the first processing delay and the second processing delay.

5. The method of claim 1, wherein the tolerance specification is determined to be greater than both of the accumulated timing error and the total processing delay.

6. The method of claim 1, further comprising:

instructing, by the processing circuitry, the stylus to perform the clock synchronization under the tolerance specification.

7. The method of claim 1, further comprising:

informing, by the processing circuitry, at least one of the stylus or the touch display device of the tolerance specification.

8. An apparatus for determining a tolerance specification of a clock synchronization between a touch display device and a stylus, comprising:

processing circuitry configured to determine an accumulated timing error between the touch display device and the stylus based on crystal inaccuracies of the touch display device and the stylus, connection interval of Bluetooth communication between the touch display device and the stylus, and a number of consecutive failed transmissions of the Bluetooth communication, determine a total processing delay based on a first processing delay and a second processing delay, the first processing delay being a time difference between a sending time of sending a synchronization signal from the touch driving circuitry of the touch display device and a receiving time of receiving the synchronization signal by Bluetooth circuitry of the touch display device, the second processing delay being a time difference between a sending time of sending a Bluetooth packet from the touch display device and a receiving time of receiving the Bluetooth packet by the stylus, and determine the tolerance specification of the clock synchronization based on the accumulated timing error and the total processing delay, wherein the clock synchronization is performed based on the tolerance specification.

9. The apparatus of claim 8, wherein the processing circuitry is configured to:

determine the accumulated timing error based on a third processing delay between a first successful Bluetooth transmission from another device to the stylus and a second successful Bluetooth transmission from the touch display device to the stylus, the first successful Bluetooth transmission being received by the stylus after the consecutive failed transmissions and before the second successful Bluetooth transmission.

10. The apparatus of claim 9, wherein the processing circuitry is configured to:

calculate a first product of the connection interval and the number of consecutive failed transmissions of the Bluetooth communication;

calculate a first sum of the first product and the third processing delay;

calculate a second sum of the crystal inaccuracies of the touch display device and the stylus; and determine the accumulated timing error as a second product of the first sum and the second sum.

11. The apparatus of claim 8, wherein the processing circuitry is configured to:

determine the total processing delay as a sum of the first processing delay and the second processing delay.

12. The apparatus of claim 8, wherein the tolerance specification is determined to be greater than both of the accumulated timing error and the total processing delay.

13. The apparatus of claim 8, wherein the processing circuitry is configured to:

instruct the stylus to perform the clock synchronization under the tolerance specification.

14. The apparatus of claim 8, wherein the processing circuitry is configured to:

inform at least one of the stylus or the touch display device of the tolerance specification.

15. A non-transitory computer-readable medium storing instructions, which when executed by an apparatus, cause the apparatus to perform a method for determining a tolerance specification of a clock synchronization between a touch display device and a stylus, the method comprising:

determining an accumulated timing error between the touch display device and the stylus based on crystal inaccuracies of the touch display device and the stylus, connection interval of Bluetooth communication between the touch display device and the stylus, and a number of consecutive failed transmissions of the Bluetooth communication;

determining a total processing delay based on a first processing delay and a second processing delay, the first processing delay being a time difference between a sending time of sending a synchronization signal from the touch driving circuitry of the touch display device and a receiving time of receiving the synchronization signal by Bluetooth circuitry of the touch display device, the second processing delay being a time difference between a sending time of sending a Bluetooth packet from the touch display device and a receiving time of receiving the Bluetooth packet by the stylus; and determining the tolerance specification of the clock synchronization based on the accumulated timing error and the total processing delay, wherein the clock synchronization is performed based on the tolerance specification.

16. The non-transitory computer-readable medium of claim 15, wherein the determining the accumulated timing error comprises:

determining the accumulated timing error based on a third processing delay between a first successful Bluetooth transmission from another device to the stylus and a second successful Bluetooth transmission from the touch display device to the stylus, the first successful Bluetooth transmission being received by the stylus after the consecutive failed transmissions and before the second successful Bluetooth transmission.

17. The non-transitory computer-readable medium of claim 16, wherein the determining the accumulated timing error comprises:

calculating a first product of the connection interval and the number of consecutive failed transmissions of the Bluetooth communication;

calculating a first sum of the first product and the third processing delay;

calculating a second sum of the crystal inaccuracies of the touch display device and the stylus; and determining the accumulated timing error as a second product of the first sum and the second sum.

18. The non-transitory computer-readable medium of claim 15, wherein the determining the total processing delay comprises:

determining the total processing delay as a sum of the first processing delay and the second processing delay.

19. The non-transitory computer-readable medium of claim 15, wherein the determining the total processing delay comprises:

determining the total processing delay as a sum of the first processing delay and the second processing delay.

20. The non-transitory computer-readable medium of claim 15, wherein the method comprises:

instructing the stylus to perform the clock synchronization under the tolerance specification.

* * * * *